Oct. 30, 1928.

B. A. BROUGHTON 1,689,911

LENS FOR AUTOMOBILE HEADLIGHTS

Filed Nov. 10, 1925     3 Sheets-Sheet 1

Inventor
B. A. Broughton
By
Hull Brock & West
Attys.

Oct. 30, 1928.
B. A. BROUGHTON
1,689,911
LENS FOR AUTOMOBILE HEADLIGHTS
Filed Nov. 10, 1925
3 Sheets-Sheet 2
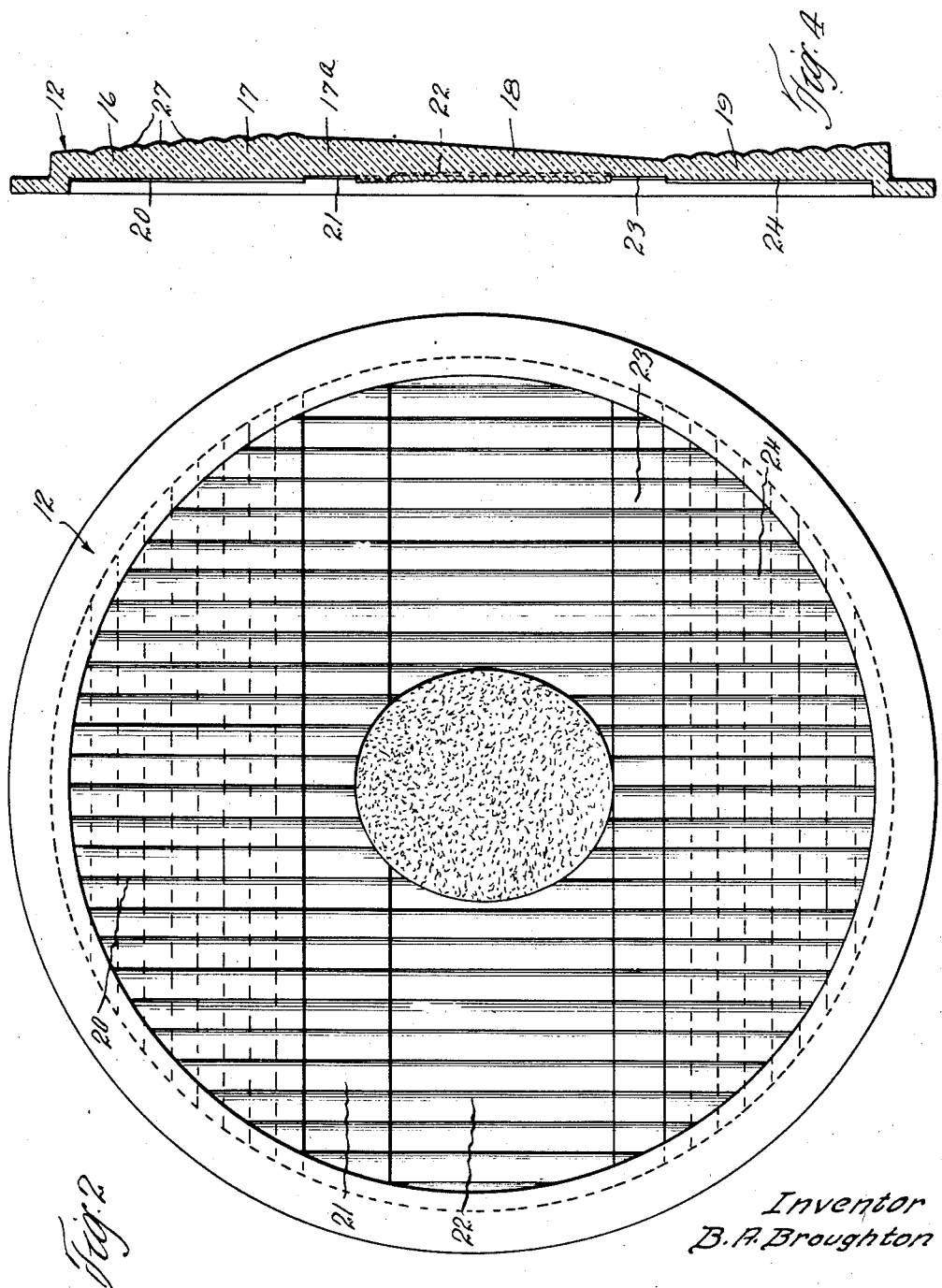

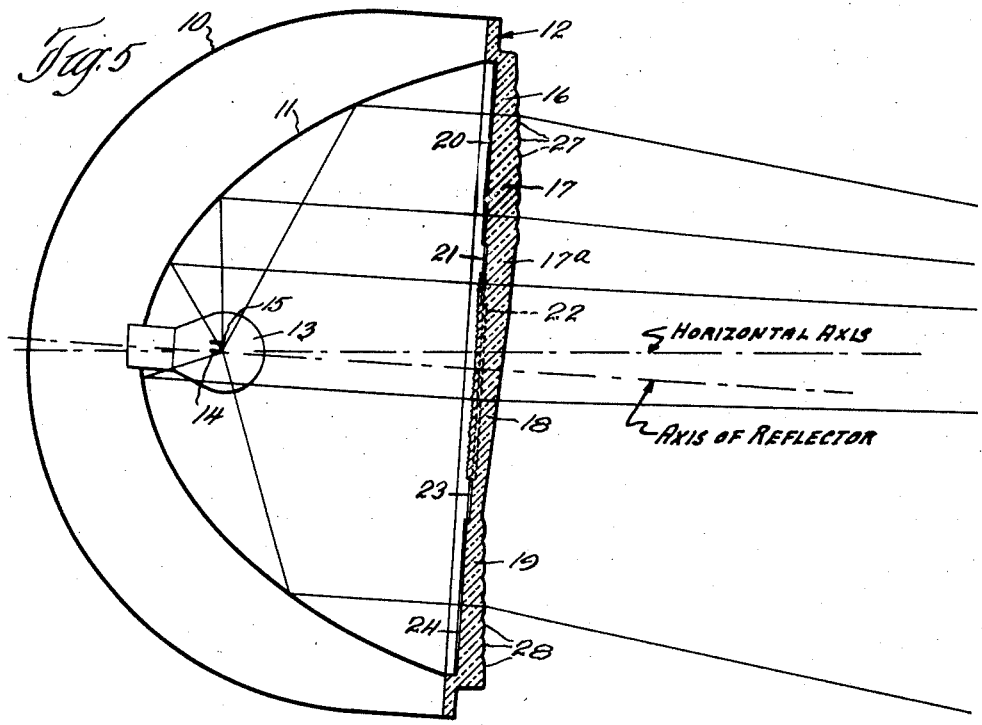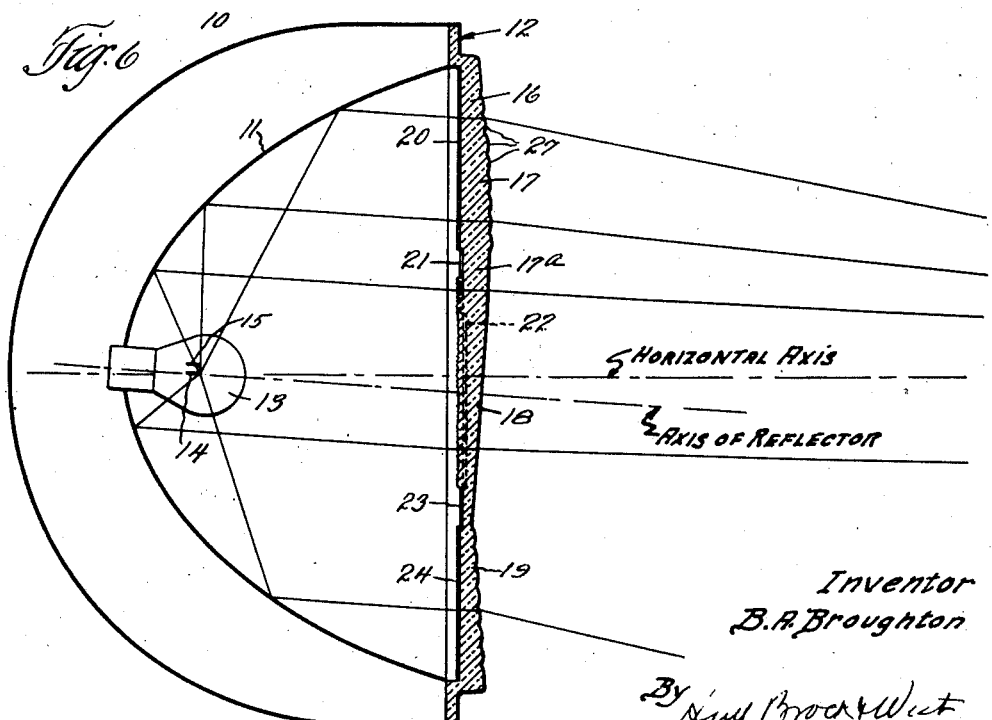

Patented Oct. 30, 1928.

1,689,911

UNITED STATES PATENT OFFICE.

BERLIN A. BROUGHTON, OF CLEVELAND HEIGHTS, OHIO, ASSIGNOR TO DELTA ENGINEERING LABORATORIES, INC., OF CLEVELAND, OHIO, A CORPORATION OF OHIO.

LENS FOR AUTOMOBILE HEADLIGHTS.

Application filed November 10, 1925. Serial No. 68,078.

This invention relates generally to automobile headlamps and more particularly to the lens forming part of said automobile headlamp.

The lens is primarily intended for use in connection with a parabolic reflector and although designed for use in connection with a two-filament incandescent bulb it will be obvious that the lens can be used also in connection with a single filament bulb.

It is well known that a large number of States have certain statutes regulating the distribution of light in automobile headlamps and there are also certain standard requirements of automobile manufacturers regarding light distribution, the objects of all such regulation being to control the beam of light so as to prevent glare and at the same time get the maximum of road illumination, that is to say, to have the beam of light carried as far forwardly as possible without glaring and at the same time give sufficient spread of light adjacent to the automobile to insure safety in passing other vehicles and also in driving along the side of the roadway.

It is with all of these requirements in view that the present lens has been devised, and one of the main objects is to provide a lens which will have all of these advantageous features and which can be economically manufactured. Furthermore, lenses having prisms with sharply defined edges are liable to become injured after fabrication. It is therefore very important that a lens be provided which can not only be economically manufactured but which will not be liable to injury after the same has once been made.

With all of these various objects in view my invention consists in the novel features of construction and arrangement, all of which will be fully described hereinafter and set forth in the appended claims.

Figure 1:
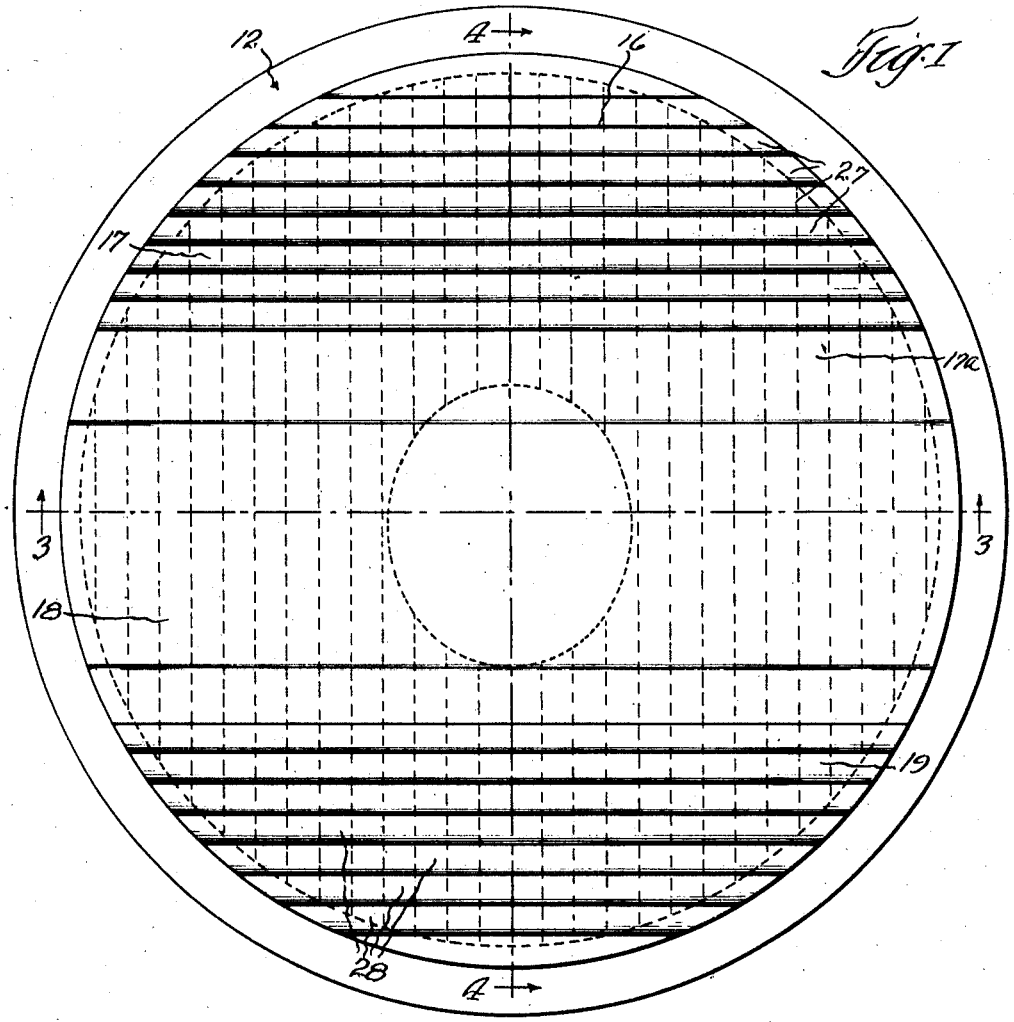
Figure 3:
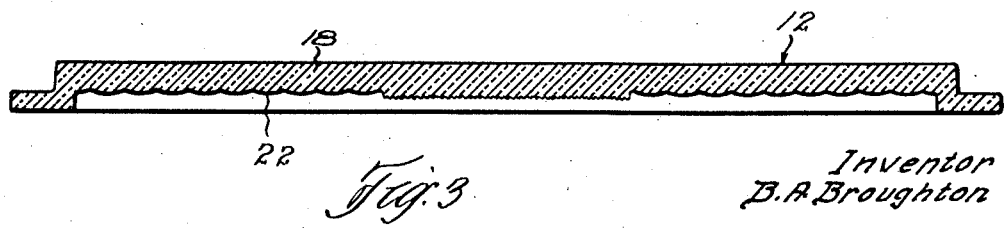

In the drawings forming part of this specification, Fig. 1 is a face view of the lens; Fig. 2 is a rear view of the lens; Fig. 3 is a horizontal section on the line 3—3 and Fig. 4 a vertical section on the line 4—4; Figs. 5 and 6 are diagrammatic views.

Referring to the drawings, 10 indicates the ordinary or usual casing of the lamp, 11 the reflector, 12 the lens and 13 the incandescent bulb having two filaments 14 and 15 and in practice it is desirable to have the lower filament 14 substantially on the axis of the reflector and as near the focal point as possible, the upper filament 15 being a short distance above the axis and focal point of the reflector.

The lens is designed to take care of all the reflected rays emanating from either filament so that the beam of light is controlled when the lower filament is illuminated for what may be termed road driving and also to control the beam when the upper filament is employed for what may be termed city driving or when passing another vehicle. Inasmuch as the light emanating from the central portion of the reflector is carried forwardly the farthest and may be termed the brightest portion of the beam it is desirable to use this light emanating from the central portion of the reflector as the top of the beam and all of the structural features of this lens for the control of the reflected rays are based upon that idea.

Now referring to the lens in detail it will be noted that the outer surface thereof is continuous, that is to say, there are no sharply defined angles such as commonly seen in prismatic lenses. While the outer surface of the lens is continuous there are prismatic surfaces of varying degrees of angularity and it will be noted that these prismatic surfaces of different degrees of angularity extend entirely across the outer face of the lens as most clearly shown.

At the top of the lens it will be noted that the zone 16 has a definite inclination and is intended to deflect a ray of light directed horizontally through the lens at this point, downwardly at approximately $3\frac{1}{2}°$, while directly below the zone 16 is a zone 17 which has an inclined surface of slightly less angularity than the zone 16, this zone 17 serving to direct the rays of light approximately $1\frac{3}{4}°$ downwardly. Directly below the zone 17 is a prism 17$^a$ so shaped as to give the rays of light passing therethrough an upward direction at approximately 1° above the horizontal. The zone 18 which is the major portion of the lens is intended to take care of the rays of light directed from the central portion of the reflector and this zone 18 has such inclination that rays of light passing therethrough will be directed slightly upwardly, approximately 2°, and below this prismatic zone 18 there is produced another zone 19 having its surface so formed as to direct rays of light passing therethrough downwardly at approximately 3° from the horizontal.

It will be understood that in order to utilize the most powerful portion of the beam for the top portion thereof that the reflector be given a slight downward tilt, that is, when a lens such as herein shown and described is employed in connection with the reflector that this tilting of the reflector can be done by tilting the headlamp as a whole or the reflector can be arranged at the proper angle within the lamp casing.

In a lens with the outer surface thereof constructed as above described it is obvious that any ray of light emanating from either filament and directed from the reflector will be held within the legal requirements and it will also be noted that the major or carrying portion of the beam will pass through the prismatic zone 18 and owing to the tilt of the reflector in combination with the upward tendency of the prism itself the top of the beam will still be carried the maximum distance slightly below the horizontal thereby giving the maximum of road illumination while the rays of light reflected from the top and bottom of the reflector will be deflected downwardly below the top of the beam and will illuminate the roadway at the points adjacent the automobile.

Now in order to laterally spread the light which is controlled vertically by the prismatic zones upon the front of the lens I propose to produce upon the rear side of the lens a series of laterally spreading prismatic surfaces and in practice I prefer to make these spreading surfaces which may be termed flutes of uniform width but in zones of different refractive or spreading power and this is accomplished by making the flutes thereof uniform in width but of differing radii Thus the vertical flutes 20 are preferably given a curvature so as to give a uniform spread of approximately 26° and the flutes in the zone 21 are given a radius to give a spread of approximately 22° and the flutes in the zone 22 which is the top of the beam are given a radius so as to spread only 12°. The flutes in the zone 23 are given a radius to provide a spread of approximately 10°, whereas the flutes in the bottom zone 24 are given a radius to produce a spread of 40° thus giving the greatest spread at the top and bottom of the lens where the rays of light are also given the greatest amount of depression and leaving the central portion or top of the beam with the least spread thereby giving the maximum of road illumination.

In all commercial parabolic reflectors used in connection with the ordinary incandescent lamp there are certain rays which would pass through the center of the lens which would be more or less difficult to control and as the best method of eliminating the glare at this point it is preferred to stipple, or render translucent otherwise, this substantially central portion of the lens and the size and shape of the translucent portion can be governed entirely by the circumstances of the case.

In bending down the rays of light and at the same time spreading those rays laterally there is a tendency to produce certain bands or stratification of light due to overlapping of certain portions of the various rays and this is more or less objectionable and in order to eliminate this banding or stratification I provide a series of horizontally arranged flutes 27 upon the front of the lens at the upper portion thereof and a similar series of horizontal flutes 28 upon the front surface of the lens at the bottom thereof. These horizontal flutes 27 and 28 are shown as uniform both as to widths and radius but it will be understood that these could be made variant if so desired.

A lens constructed as herein shown and described has proved under actual test to operate in the manner desired for producing good road illumination and has been found particularly advantageous for use in connection with the two filament bulb and parabolic reflector, the thick prism at the top particularly taking care of and directing downwardly those rays of light which would be directed upwardly from the upper filament of the two filament bulb and the central portion of the lens which takes care of the top of the beam is so constructed that it would ordinarily deflect the rays slightly upwardly but as the reflector is arranged at an angle this top of the beam is directed slightly below the horizontal so as to eliminate glare but has the maximum of carrying power. The beam will be depressed most at the top and bottom of the lens utilizing those rays which emanate from the front, top and bottom portions of the reflector for giving the road illumination close to the vehicle and these rays which are depressed the most at the top and bottom are also given the greatest lateral spread. By means of the horizontal flutes upon the exterior of the lens all smoothing out of the bands of light is accomplished and a uniform light is provided. By having the continuous exterior surface the fabrication of the lens is rendered economical and by having the flutes uniform in width this also adds materially to the economy of production inasmuch as the machining and subsequent care of the molds is greatly facilitated.

It will thus be seen that I provide a simple and highly efficient type of lens capable of accomplishing all the objects hereinbefore recited.

In Figs. 5 and 6 I have shown two diagrams illustrating the use of my invention. In Fig. 5 the casing and reflector are both inclined downwardly a slight distance, approximately 3 degrees below the horizontal and in Fig. 6 the reflector only is tilted downwardly approximately 3 degrees below the horizontal. In both instances, the lower filament remains on the axis of the reflector and substantially at the focal point thereof.

When the reflector only is tilted, the lens remains approximately vertical with reference to the roadway, whereas when both casing and reflector are tilted the lens is also inclined slightly with reference to the roadway.

Having thus described my invention, what I claim is:

1. A headlight lens having upon its exterior surface prisms of varying degrees of refraction, the exterior surface as a whole being continuous and having no sharply defined edges, the prisms at the top of the lens providing the greatest downward refraction, the prism at the center of the lens giving the greatest upward refraction, there being intermediate prisms between the prisms giving the greatest downward and the greatest upward refraction, the prism at the bottom also giving downward refraction.

2. A headlight lens having upon its exterior surface prisms of varying degrees of refraction, the exterior surface as a whole being continuous and having no sharply defined edges, the top and bottom prisms of said lens being shaped to give the greatest downward deflection, the inner face of the lens having a series of vertical flutes or prisms, said flutes or prisms being of uniform width but arranged in zones of varying radii of flutes or prisms, the prisms at the top and bottom being shaped to give greater spread to the rays than the intermediate prisms, the top and bottom exterior prisms also having a series of horizontal flutes produced thereon.

In testimony whereof, I hereunto affix my signature.

BERLIN A. BROUGHTON.